Patented Mar. 6, 1923.

1,447,400

UNITED STATES PATENT OFFICE.

ARTHUR STOLL, OF BASEL, SWITZERLAND, ASSIGNOR TO CHEMICAL WORKS FORMERLY SANDOZ, OF BASEL, SWITZERLAND.

PROCESS FOR THE MANUFACTURE OF ALKALOIDS.

No Drawing. Application filed April 30, 1919. Serial No. 293,800.

*To all whom it may concern:*

Be it known that I, ARTHUR STOLL, citizen of the Swiss Republic, and resident of Basel, Switzerland, have invented a new and useful Process for the Manufacture of Alkaloids.

The known processes for the isolation of alkaloids from the commercial drugs begin ordinarily by extracting the bases in form of their salts with acidified water (Holleman, Organic Chemistry, pages 563 and 564, paragraph 472 and U. S. Letters Patent, Schaerges No. 1056219, dated March 18, 1913), or in the form of a mixture of salts of vegetable acids and of free bases, by extracting with alcohol and other organic solvents mixable with water, or as free bases by extracting the materials containing the alkaloids with solvents of fatty bodies, after suitably liberating the alkaloids from their natural binding by addition of alkaline substances, the extract obtained containing in all these cases more or less impurities (Holleman, loco cit.). In order to reduce the quantity of these impurities and to facilitate the further purification of the bases, mostly by passing over their salts, the drugs are often extracted previously with solvents of fatty bodies, in which the alkaloids are insoluble, generally with hydrocarbons of petroleum. The subsequent extraction of the alkaloids gives then solutions containing smaller quantities of impurities than by extracting directly with the solvents of alkaloids. In most cases, considerable quantities of impurities and particularly, when operating with leaves, the colouring matters contained in them, which cannot be extracted with hydrocarbons of petroleum, contaminate the extract of alkaloid to such an extent that further operations of purifying the bases become necessary, which are mostly based upon their property to form salts soluble in water. Apart from the greater circumstantiality and the losses unavoidable with each operation, this is particularly disadvantageous, when alkaloids are to be isolated, which are sensitive to the direct action of acids and alkalies.

The new process is similar to the one just mentioned in as far as in both the proper extraction of the alkaloid is preceded by a previous extraction for the separation of impurities. But both processes differ materially in the working methods as well as by the results.

I have found that by adding acid reagents to the natural drugs containing the alkaloids, the chemical binding of the alkaloids with the insoluble cellulose substance becomes so fast that it becomes possible to separate completely the soluble nonbasic impurities of the alkaloids by a previous extraction with solvents of the said soluble nonbasic impurities, while the alkaloids themselves remain undissolved. After destroying the chemical binding between the alkaloids and the unsoluble cellulose substance by addition of alkaline reagents, the bases are extracted, free of impurities, with the same solvent of alkaloid which has been employed for the previous extraction, and are obtained from the concentrated extract either as crystallized free bases, or they are isolated directly in form of their pure salts. The purification of the alkaloids, that is the complete separation of the soluble impurities is consequently done in the new process, contrary to the methods already known while the bases are still bound in the cellulose substance; the proper alkaloid extraction gives then pure solutions of alkaloids and that whatever the material may be from which one starts.

For the isolation of pure alkaloids or therapeutically important alkaloid mixtures from raw extracts, dried juices of vegetables and other artificial products of the trade, rich of alkaloids, the previous treatment with the acid reagents is effected in presence of natural cellulose substance, as for instance of leaf powder, and thus the firm binding of the bases with the insoluble cellulose substance is produced, which is necessary for the previous extraction of the non-basic impurities accompanying the alkaloids.

When dried vegetables, containing alkaloids, in small pieces, as for instance of *Areca catechu* L., species of Pilocarpus, *Spartium scoparium* L., Solanaceæ, *Erythroxylon coca* Lamarck, *Hydrastis canadensis* L., Cinchona Strychnos, Aconitum, *Schoenocaulon ocinale* A. G., *Colchicum auctumnale* L., *Physostigma venenosum* Balfour, *Corynanthe yohimbe* K. Schum, *Uragoga ipecacuanha* Baill, etc., or dried extracts containing alkaloids and commercial juices of vegetables, such as opium, curare, etc., in presence of natural cellulous substance, like leaf powder previously extracted with alcohol and benzene, are treated with acid reagents as for instance dilute acids or solutions of acid salts, as aluminium sulfate, ferrosulfate, ferrichloride, copper sulfate, the alkaloids remain fixed by the insoluble vegetable substance so that they are not dissolved by solvents of fatty bodies being not mixable with water. Therefore the non-basic soluble impurities of the alkaloids, which soil these latter when the extraction is conducted according to known methods, can be separated from the vegetable substance with a solvent of fatty bodies, as for instance ether, benzene and its homologues, chlorinated hydrocarbons, acetic ester, without extracting the alkaloids. By the addition of alkaline substances, as, for instance, alkali hydroxides or earth-alkali hydroxides, ammonia or magnesium oxide, alkali carbonates or bicarbonates or earth-alkali carbonates or bicarbonates to the material thus purified by a previous extraction and suspended in the solvent of fatty bodies employed for the said extraction, the alkaloids are liberated and can be extracted free of impurities. From the concentrated extract the bases are either obtained directly in a crystallized form or they can be isolated, almost quantitatively, in the form of their crystallized salts, Experiences proved that the new process can be employed successfully for the extraction of alkaloids from all the above specified parent materials. In the hereafter described examples typical cases were chosen as well for the nature of the parent materials, which are leaves in Example 1$^a$ and 2, roots in Example 3, barks in Example 4, dried plant juice in Example 5 and commercial extract in Example 1$^b$, as for the nature of the final products, which are single alkaloids in Examples 1 to 4, the whole alkaloids of the parent material in Example 5, free bases in Examples 1, 3 and 4 and salts in Examples 2 and 5, and for the most various chemical structures which comprise pilocarpine, a derivative of glyoxaline, in Example 2, hyoscyamine, a derivative of tropine in Example 1, narcotine and other derivatives of isoquinoline in Example 5, morphine and other derivatives of phenanthrene in Example 5, aconitine and yohimbine of undetermined structures in Examples 3 and 4.

In the following there will further be described in what manner the new process can be appropriated to further differences in the physical and chemical properties of the alkaloids, without departing from the principle of the process broadly defined in the claims, in order that the bases also in most complicated mixtures may be isolated without losses.

This isolation of alkaloids without losses is particularly useful, when for the obtaining of a particular therapeutical effect the so-called accessory alkaloids of a drug are necessary in an alkaloid preparation in their natural proportion relatively to one or several principal alkaloids. By a convenient choice of solvents and reagents the new general process is able to be utilized for this purpose. On the other hand the great adaptability of the process allows also the direct isolation of single alkaloids from drugs containing several alkaloids in consequence of the different solubilities and basicities of the vegetable bases. The Example 5 for the isolation of alkaloids of opium and their separation in strong and weak bases shows very distinctly the great adaptability of the new process to the various extractions of alkaloids. Without loss of soluble basic substances of the opium, it becomes possible to isolate in a simple manner the bases free of admixtures and to separate the strongly basic alkaloids of the morphine group from the weakly basic alkaloids of the narcotine group. By a convenient choice of the solvents it becomes further possible to separate in a pure state, in the course of extraction already, the most important opium alkaloid, viz, the morphine, from other bodies accompanying it.

The previous extraction of the acidified material, especially the extraction of the leaf dyestuff, is accelerated and becomes more complete when adding to the solvent of fatty bodies 1 to 10 per cent (by volume) ethyl alcohol or other organic indifferent solvents mixable with water, without dissolution of strongly basic alkaloids, as, for instance, arecoline, pilocarpine, hyoscyamine, cocaine, morphine, aconitine, yohimbine, etc. For the extraction of the liberated bases from the vegetable substance, there are employed for the isolation of alkaloids, which are very difficultly soluble in solvents for fatty bodies, as, for instance, morphine, solvents for fatty bodies, which contain up to 10 per cent alcohol or other indifferent organic solvents mixable with water.

*Example 1.*

*Manufacture of hyoscyamine.*

(a) *From leaves.*

2 kilos of dried belladonna leaves finely powdered are thoroughly mixed with 60 gr. of strong sulfuric acid, dissolved in 250 ccm. water; the mass is moistened with 1 liter of benzene and extracted in a percolator with benzene containing 5 per cent (by volume) of ethyl alcohol, until the liquid passes without showing any coloration. The liquid is separated by suction, the remaining material is energetically stirred with 4 liters of benzene and thereafter 320 ccm.

of ammonia of 25 per cent are added thereto by drops. The stirring is further continued for 2 hours and the liquid is separated by suction and the residue is washed in the course of 3 hours with about 3 liters of benzene added in portions of ⅓ liter each, while a temporary suction is maintained. After concentration of the extract thus obtained under a reduced pressure to a small volume, the hyoscyamine separates in the cold for the most part in long needles melting at 107 to 108° C. It contains 4.8 per cent nitrogen and shows a negative rotation;

$[\alpha]$ D was found $= -20.5°$ to $-21.5°$.

(b) *From raw extract.*

100 gr. extract of belladonnae spir. spiss. PH. H. IV. are mixed thoroughly with 250 gr. of previously extracted leaf powder, which has been moistened with 60 gr. of sulfuric acid of 25 per cent, then moistened with benzene and worked up as indicated sub *a*.

*Example 2.*

Manufacture of pilocarpine nitrate.

2 kilos of finely pulverized leaves of pilocarpus are mixed gradually in a bullet-mill with 400 gr. of a tepid aqueous solution of oxalic acid of 25 per cent, thereafter moistened with 1.2 liters of benzene and then extracted exhaustively in a percolator with benzene containing, by volume, 5 per cent alcohol.

The remaining material is then mixed with 300 gr. technical magnesia, macerated with benzene in a percolator and the liberated bases are finally extracted exhaustively. The extract concentrated in vacuo constitutes a heavy oil which can be dissolved in diluted nitric acid, leaving a trace of non basic substance undissolved. From the crystalline raw nitrate obtained by evaporation of the aqueous salt solution pure pilocarpine nitrate can be obtained with a good yield by recrystallizing from alcohol of 90 per cent.

*Example 3.*

Manufacture of crystallized aconitine.

3 kilos of carefully dried and pulverized roots of *Aconitum napellus* L. are stirred with 450 ccm. hydrochloric acid of 8 per cent, hereafter mixed with 1 liter of ether and previously extracted exhaustively in a percolator with ether containing 5 per cent alcohol. The material remaining after the extraction is then suspended in 6 liters of pure ether, to the resulting pappy mass 700 ccm. of aqueous ammonia of 16 per cent are gradually added, while stirring, and after 2 hours the liquid is separated by suction and washed exhaustively with ether employed by portions. By concentration to a small volume the aconitine separates partly in well formed crystals. Further precipitates formed during a further concentration are amorphous, but can be transformed easily in a known manner into pure crystallized aconitine. The crystallized product contains 2.2 to 2.3 per cent nitrogen, it melts at 197 to 198° C. and shows a positive rotation;

$$[\alpha]\frac{18}{D}$$

in a solution of 2 per cent in absolute alcohol $= + 17°$ C.

*Example 4.*

Manufacture of crystallized yohimbine.

2 kilos of finely pulverized bark of *Corynanthe yohimbe* K. Schum are moistened in a mixing drum with 200 gr. of sulfuric acid of 30 per cent; after the resulting mass has been mixed with 1¼ liter benzene, it is extracted exhaustively in a percolator, advantageously at 50° C., with benzene containing 5 per cent ethyl alcohol; alkaloid is thereby not dissolved or destroyed. The bark powder suspended in 8 liters of benzene is then treated with gaseous ammonia until pronounced alkaline reaction, the liquid is separated by suction and the residue is washed with benzene. From the concentrated extract pure yohimbine crystallizes in a good yield. After it has been separated by filtration and washed with a small quantity of benzene it is only weakly yellow colored, dissolves in dilute acids to clear solutions, melts at 232 to 234° C. and shows a positive rotation;

$$[\alpha]\frac{18}{D}$$

in a solution of 1 per cent in absolute alcohol $= + 52°$. The oily mother-lye contains besides of a small quantity of yohimbine the other basic components of the drug, which are nearly completely soluble in dilute hydrochloric acid and can be worked up according to known methods.

*Example 5.*

Isolation of the whole alkaloids of opium and their separation in strong and in weak bases.

1 kilo pulverized opium is triturated for a prolonged time with 5 kilos of leaf powder which has been purified by extraction with alcohol and benzene, and has been previously mixed thoroughly with a solution of 1.2 kilo crystallized aluminium sulfate in 0.6 liter of water; thereafter the mass is moistened with 4 liters of benzene and extracted in a percolator with benzene containing 10 per cent ethyl alcohol, until the percolate shows no further fatty bodies and only small quantities of alkaloids. The leaf dust acidified by aluminium sulfate retains morphine and analogous alkaloids, whilst narcotine and other weakly basic alkaloids are contained in the percolate with the non basic soluble impurities. While distilling off all the alcohol contained in the percolate this latter is concentrated to about 5 liters to which are added 5 kilos of previously extracted leaf powder, which was previously acidulated gradually with such a quantity of sulfuric acid of 50 per cent as free mineral acid would be detected therein. The moist powder is then extracted exhaustively in a precolator with pure benzene. When sufficiently strong acidified leaf substance has been employed, the liquid flows from the percolator completely free of alkaloid. Each of the both previously extracted leaf powders is then suspended in 20 liters of benzene, gaseous ammonia is introduced in both the suspensions while stirred, both the masses are filtered and the residue washed with benzene until the alkaloid reactions disappear. The morphine nearly insoluble in benzene remains in the leaf powder and is dissolved by a further extraction with a large quantity of benzene containing 10 per cent alcohol at 50 to 60° C., while some gaseous ammonia is still introduced. The liquid is then separated by suction and the residue washed exhaustively with hot solvent. When the liquid is evaporated the pure morphine crystallizes. Both the first obtained extracts containing the one the weakly basic alkaloids, especially those of the narcotine group and the other the stronger bases, analogous of the morphine, are complicated mixtures of alkaloids which crystrallize only when the extracts are concentrated to dryness in vacuo. They constitute, like the remaining portion of the morphine fraction evaporated to dryness, light-brownish colored products and contain merely traces of impurities. By dissolving the bases with a sufficient quantity of a mineral acid, filtering off from the few brown waxy flocks and concentrating the aqueous solution in vacuo, there are obtained crystalline mixtures of alkaloid salts, which are only lightly yellowish colored and dissolve in water to clear solutions.

What I claim is:

1. The herein described process for the manufacture of alkaloids, which consists in adding to the drug acid reagents, in order to make the alkaloids in the vegetable substance insoluble in solvents of fatty bodies boiling at low temperatures and being not mixable with water, extracting the soluble impurities of the alkaloids with such a solvent, without dissolving the alkaloids, suspending the material thus purified by a previous extraction in the solvent of fatty bodies and making the suspension obtained alkaline, extracting the alkaloids thus liberated, concentrating the resulting pure solution of alkaloids, crystallizing at least one alkaloid from the concentrated extract and separating it by filtration.

2. The herein described process for the manufacture of alkaloids, which consists in adding to the drug acid reagents, in order to make the alkaloids in the vegetable substance insoluble in solvents of fatty bodies boiling at low temperatures and being not mixable with water, extracting the soluble impurities of the alkaloids with such a solvent, without dissolving the alkaloids, suspending the material thus purified by a previous extraction in the solvent of fatty bodies and making the suspension obtained alkaline, extracting the alkaloids thus liberated, concentrating the resulting pure solution of alkaloids, transforming the alkaloids of the concentrated extract into salts, crystallizing at least one of the said salts from the concentrated extract and separating it by filtration.

3. The herein described process for the manufacture of alkaloids, which consists in treating extracts of vegetables of the trade and dried juices of vegetables which contain alkaloids, with acid reagents in presence of natural cellulous substance, in order to fix the alkaloids in this latter in such a manner that they become insoluble in solvents of fatty bodies boiling at low temperatures and being not mixable with water, extracting the soluble impurities of alkaloids with such a solvent, without dissolving the alkaloids, suspending the material, thus purified by a previous extraction, in the solvent of fatty bodies and making the suspension obtained alkaline, extracting the alkaloids thus liberated, concentrating the resulting pure solution of alkaloids, crystallizing at least one alkaloid from the concentrated extract and separating it by filtration.

4. The herein described process for the manufacture of alkaloids, which consists in treating extracts of vegetables of the trade and dried juices of vegetables which contain alkaloids, with acid reagents in presence of natural cellulous substance, in order to fix the alkaloids in this latter in such a manner that they become insoluble in solvents of fatty bodies boiling at low temperatures and being not mixable with water, extracting the soluble impurities of alkaloids with such a solvent, without dissolving the alkaloids, suspending the material, thus purified by a previous extraction, in the solvent of fatty bodies and making the suspension obtained alkaline, extracting the alkaloids thus liberated, concentrating the resulting pure solution of alkaloids, transforming the alkaloids of the concentrated extract into salts, crystallizing at least one of the said salts from the concentrated extract and separating it by filtration.

5. The process for the manufacture of alkaloids which consists in adding acid reagents to the drug, in order to make the alkaloids of the vegetable substance insoluble in solvents of fatty bodies boiling at low temperatures and being not mixable with water, extracting the soluble impurities of the alkaloids with such a solvent mixed with up to 10 per cent of ethyl alcohol without dissolving the alkaloids, suspending the material of extraction, thus purified by a previous extraction, in the solvent of fatty bodies, and making the suspension obtained alkaline, extracting the alkaloids thus liberated, concentrating the resulting pure solution of alkaloids, crystallizing at least one alkaloid from the concentrated extract and separating it by filtration.

6. The process for the manufacture of alkaloids which consists in adding acid reagents to the drug, in order to make the alkaloids of the vegetable substance insoluble in solvents of fatty bodies boiling at low temperatures and being not mixable with water, extracting the soluble impurities of the alkaloids with such a solvent mixed with up to 10 per cent of ethyl alcohol without dissolving the alkaloids, suspending the material of extraction, thus purified by a previous extraction, in the solvent of fatty bodies, and making the suspension obtained alkaline, extracting the alkaloids thus liberated, concentrating the resulting pure solution of alkaloids transforming the alkaloids of the concentrated extract into salts, crystallizing at least one of the said salts from the concentrated extract and separating it by filtration.

7. The process for the manufacture of alkaloids which consists in adding acid reagents to the drug, in order to make the alkaloids of the vegetable substance insoluble in solvents of fatty bodies boiling at low temperatures and being not mixable with water, extracting the soluble impurities of the alkaloids with such a solvent, suspending the material of extraction thus purified by a previous extraction, in the solvent of fatty bodies and making the suspension obtained alkaline, extracting the alkaloids thus liberated, which are very difficultly soluble in the pure solvent of fatty bodies, with the solvent of fatty bodies containing 10 per cent alcohol, concentrating the resulting pure solution of alkaloids, crystallizing at least one alkaloid from the concentrate extract and separating it by filtration.

8. The process for the manufacture of alkaloids which consists in adding acid reagents to the drug, in order to make the alkaloids of the vegetable substance insoluble in solvents of fatty bodies boiling at low temperatures and being not mixable with water, extracting the soluble impurities of the alkaloid with such a solvent, suspending the material of extraction, thus purified by a previous extraction, in the solvent of fatty bodies and making the suspension obtained alkaline, extracting the alkaloids thus liberated, which are very difficultly soluble in the pure solvent of fatty bodies, with the solvent of fatty bodies containing 10 per cent alcohol, concentrating the resulting pure solution of alkaloids, transforming the alkaloids of the concentrated extract into salts, crystallizing at least one of the said salts from the concentrated extract and separating it by filtration.

In witness whereof I have hereunto signed my name this 12th day of April 1919, in the presence of two subscribing witnesses.

ARTHUR STOLL.

Witnesses:
SCOTT TAGGART,
AMAND BRAUN.